(12) United States Patent
Xing et al.

(10) Patent No.: US 9,519,409 B2
(45) Date of Patent: Dec. 13, 2016

(54) APPLICATION PROGRAM INTERFACE DISPLAY METHOD, DEVICE, TERMINAL AND READABLE STORAGE MEDIUM

(71) Applicant: Tencent Technology (Shenzhen) Company Limited, Guangdong (CN)

(72) Inventors: Huihao Xing, Guangdong (CN); Yuanxue Zhao, Shenzhen Guangdong (CN); Yi Hu, Guangdong (CN); Ning Cao, Guangdong (CN); Donglin Pu, Guangdong (CN); Zhenyu Yu, Guangdong (CN); Huan Wang, Guangdong (CN); Lei Jiang, Guangdong (CN); Kai Xu, Guangdong (CN); Qingyou Zhao, Guangdong (CN); Zijian He, Guangdong (CN); Cong Zhang, Guangdong (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/404,753

(22) PCT Filed: May 31, 2013

(86) PCT No.: PCT/CN2013/076543
§ 371 (c)(1),
(2) Date: Dec. 1, 2014

(87) PCT Pub. No.: WO2013/178087
PCT Pub. Date: Dec. 5, 2013

(65) Prior Publication Data
US 2015/0185998 A1 Jul. 2, 2015

(30) Foreign Application Priority Data

Jun. 1, 2012 (CN) .......................... 2012 1 0178987

(51) Int. Cl.
*G06F 3/0484* (2013.01)
*G06F 3/0481* (2013.01)
(Continued)

(52) U.S. Cl.
CPC ........... *G06F 3/0484* (2013.01); *G06F 3/0481* (2013.01); *G06F 9/4443* (2013.01); *G06F 9/54* (2013.01)

(58) Field of Classification Search
CPC .... G06F 3/0481; G06F 9/4443; G06F 21/126; G06F 3/0484; G06F 9/54; H04N 2007/145; H04N 7/141; H04N 21/235; H04N 21/41407
See application file for complete search history.

(56) References Cited

U.S. PATENT DOCUMENTS 6,609,146 B1 * 8/2003 Slotznick .............. G06F 9/4443
709/200
7,356,775 B2 4/2008 Ruelle et al.
(Continued)

FOREIGN PATENT DOCUMENTS

CN 101308449 11/2008
CN 101627360 1/2010

OTHER PUBLICATIONS

Internatonal Search Report mailed Sep. 12, 2013.
Office Action issued in corresponding Korean Application No. 2014-7036758, mailed on Jul. 17, 2015.
International Search Report issued in corresponding International Application No. PCT/CN2013/076543 mailed Sep. 13, 2013.
(Continued)

*Primary Examiner* — Linh K Pham
(74) *Attorney, Agent, or Firm* — Morgan, Lewis & Bockius LLP

(57) ABSTRACT

The present invention relates to the field of computers. Disclosed are an application program interface display method, device, terminal and readable storage medium. The method comprising: displaying a first window on the full
(Continued)

screen and displaying a first application program interface in the first window; displaying a second window above the first window, and displaying a second application program interface in the second window; and always maintaining the first window in a focused state during switching between the first window and the second window. The above technical solution ensures that the application program interface displayed in the first window remains functional without losing the focused state, and the application program interface displayed in the second window remains to be displayed above the first window even in a non-focused state, thus facilitating operation. Additionally, the application program interface display manner has no limitations being intercepted, thus improving universality and reliability.

12 Claims, 4 Drawing Sheets

(51) Int. Cl.
*G06F 9/44* (2006.01)
*G06F 9/54* (2006.01)

(56) References Cited

U.S. PATENT DOCUMENTS

| | | | |
|---|---|---|---|
| 8,203,985 B2* | 6/2012 | Gong | H04W 52/0216 |
| | | | 370/311 |
| 8,214,768 B2 | 7/2012 | Boule et al. | |
| 8,296,684 B2* | 10/2012 | Duarte | G06F 3/0481 |
| | | | 715/863 |
| 2005/0075885 A1* | 4/2005 | Danieli | A63F 13/12 |
| | | | 704/276 |
| 2005/0183017 A1* | 8/2005 | Cain | G06F 8/38 |
| | | | 715/719 |
| 2006/0061597 A1* | 3/2006 | Hui | G06F 3/0481 |
| | | | 345/629 |
| 2008/0168401 A1 | 7/2008 | Boule et al. | |
| 2009/0041357 A1* | 2/2009 | Yonezawa | G06K 9/00248 |
| | | | 382/195 |

OTHER PUBLICATIONS

Tencent Technology, IPRP, PCT/CN2013/076543, DEC. 2, 2014, 4 pgs.

\* cited by examiner

APPLICATION PROGRAM INTERFACE DISPLAY METHOD, DEVICE, TERMINAL AND READABLE STORAGE MEDIUM

TECHNICAL FIELD

The present disclosure relates to the fields of computer technologies, and specifically to, an application program interface display method, a device, a terminal and a readable storage medium.

BACKGROUND

With the continuous developments of computer technology, more and more applications have been used. In order to meet different operation requirements to the applications by a user, when an application is running, application scenarios of other applications are also used at the same time. For example, when a game application program is ran, a voice application program is needed for realizing a voice commutation function synchronously with playing game. Thus, when an application program interface is displayed, other application program interface is also need to be displayed.

In existing technology, when two or more than two application program interfaces are displayed, each application program interface of the two or more than two application is generally displayed in a corresponding window. When the user wants to operate any of the application program interfaces, the windows displaying the corresponding application program interfaces are switched in order to position a focus on the window which is operated. For the application scenarios of playing games while voice communications, in the existing technology, when a game application program interface and a voice application program interface are displayed at the same time, a voice application program is firstly started, once a game process is detected to be started, the voice application program interface is injected into the game application program interface through a Hook technology. Then the voice application program interface is compulsively displayed when the game application program interface is displayed. In another word, two application program interfaces (the voice application program interface and the game application program interface) are synchronously displayed in one window.

During the process of realizing the present disclosure, at least following problems exist in the existing technology. When the window displays the corresponding application program interface in the existing technology, a focus should be located on the window which is operated, which may bring a frequent switching of the focus, and is not conducive to a user experience. Moreover, this way of displaying the game application program interface on a full screen will impact game pictures and further reduce user experience once the window displaying the game application program interface loses the focus. The way of displaying game application program interface and voice application program interface on the same window through Hook technology may be easy to be misjudged to be a Trojan virus by all kinds of security application programs, so that the security application programs intercept a Hook action, which may cause a poor universality to the existing technology. In addition, the safety application forcibly intercepts the pictures to generated, which may also lead to a risk of generating a game unsuccessfully. Thus, a reliability of the existing technology is poor.

SUMMARY

In order to ensure a function of the application program in the condition of displaying two application program interfaces at the same time and to further improve universality and reliability of displaying the application program interfaces, an application program interface display method, a device, a terminal and a readable storage medium are provided in embodiments of present disclosure. The technical solutions of the application program interface display method, the device, the terminal and the readable storage medium are described as follow.

An application program interface display method is provided in an embodiment of present disclosure. The method includes:

displaying a first window on a full screen, and displaying a first application program interface in the first window;

displaying a second window above the first window, and displaying a second application program interface in the second window; and maintaining the first window in a focused state during switching between the first window and the second window.

The step of always maintaining the first window in a focused state during switching between the first window and the second window includes:

setting a WS_EX_NOACTIVATE property for the second window, and always maintaining the first window in a focused state during switching between the first window and the second window according to the WS_EX_NOACTIVATE property.

Further, the step of displaying a second application program interface in the second window includes:

displaying the second application program interface in a full mode in the second window, or displaying the second application program interface in a speed mode in the second window;

the second application program interface in the full mode displays all the interface information of the second application program; the second application program interface in the speed mode displays simplified interface information of the second application program.

In addition, after the step of the second application program interface in the full mode displays all interface information of the second application program; the second application program interface in the speed mode displays simplified interface information of the second application program, the method further includes:

switching the second application program interface displayed in the second window between the full mode and the speed mode according to a selection of a user, when the second application program interface is switched from the full mode to the speed mode, releasing resources occupied by the second application program interface in the full mode, when the second application program interface is switched from the full mode to the speed mode.

In addition, after the step of displaying a second window above the first window, the method further includes:

switching the second window between a hidden state and a display state according to a selection of the user.

the first application program interface displayed in the first window is a game application program interface, and the second application program interface displayed in the second window is a voice application program interface.

An application program interface display device is provided in an embodiment of present disclosure. The device includes:

a first displaying module configured to display a first window on a full screen, and display a first application program interface in the first window;

a second displaying module configured to display a second window above the first window, and display a second application program interface in the second window; and a focused state keeping module configured to always maintain the first window displayed by the first displaying module in a focused state during switching between the first window displayed by the first displaying module and the second window displayed by the second displaying module.

The focused state keeping module is specifically configured to set a WS_EX_NOACTIVATE property for the second window, and always maintain the first window in a focused state during switching between the first window and the second window according to the WS_EX_NOACTIVATE property.

The second displaying module is specifically configured to display the second application program interface in a full mode by the second window, or display the second application program interface in a speed mode by the second window;

the second application program interface in the full mode displays all interface information of the second application program. The second application program interface in the speed mode displays simplified interface information of the second application program.

In addition, the device further includes:

a first switching module configured to switch the second application program interface displayed in the second window between the full mode and the speed mode according to a selection of a user;

a source releasing module configured to releasing sources occupied by the second application program interface in the full mode, when the second application program interface is switched by the first switching module from the full mode to the speed mode.

In addition, the device further includes:

a second switching module configured to switch the second window displayed by the second displaying module between a hidden state and a display state according to a selection of the user.

The first application program interface displayed by the first window which is displayed in the first displaying module is a game application program interface, and the second application program interface displayed in the second window which is displayed by the second displaying module is a voice application program interface.

A terminal is also provided in an embodiment of present disclosure. The terminal includes:

a memory;

one or more than one programs stored in the memory, and being implemented by one or more than one processors, the one or more than one programs configured to implement a method:

displaying a first window on a full screen, and displaying a first application program interface in the first window;

displaying a second window above the first window, and displaying a second application program interface in the second window; and always maintaining the first window in a focused state during switching between the first window and the second window.

In addition, the step of always maintaining the first window in a focused state during switching between the first window and the second window comprises:

setting a WS_EX_NOACTIVATE property for the second window, and always maintaining the first window in a focused state during switching between the first window and the second window according to the WS_EX_NOACTIVATE property.

In addition, the step of displaying a second application program interface in the second window includes:

displaying the second application program interface in a full mode in the second window, or displaying the second application program interface in a speed mode in the second window;

the second application program interface in the full mode displays all interface information of the second application program; the second application program interface in the speed mode displays simplified interface information of the second application program.

In addition, after the step of the second application program interface in the full mode displays all interface information of the second application program; the second application program interface in the speed mode displays simplified interface information, the method further including:

switching the second application program interface displayed in the second window between the full mode and the speed mode according to a selection of a user, and releasing resources occupied by the second application program interface occupied in the full mode, when the second application program interface is switched from the full mode to the speed mode.

In addition, after the step of displaying a second window above the first window, the method further including:

switching the second window between a hidden state and a display state according to a selection of the user.

In addition, the first application program interface displayed in the first window is a game application program interface, and the second application program interface displayed in the second window is a voice application program interface.

A readable storage medium is provided in an embodiment of present disclosure. The readable storage medium stores one or more than one programs, the one or more than one programs are implemented by one or more than one processors to implement a method:

displaying a first window on a full screen, and displaying a first application program interface in the first window;

displaying a second window above the first window, and displaying a second application program interface in the second window; and always maintaining the first window in a focused state during switching between the first window and the second window.

In addition, the step of always maintaining the first window in a focused state during switching between the first window and the second window includes:

setting a WS_EX_NOACTIVATE property for the second window, and always maintaining the first window in a focused state during switching between the first window and the second window according to the WS_EX_NOACTIVATE property.

In addition, the step of displaying a second application program interface in the second window includes:

displaying the second application program interface in a full mode in the second window, or displaying the second application program interface in a speed mode in the second window;

the second application program interface in the full mode displays all interface information of the second application program; the second application program interface in the speed mode displays simplified interface information of the second application program.

In addition, the step of the second application program interface in the full mode displays all interface information of the second application program; the second application program interface in the speed mode displays simplified interface information of the second application program, the method further including:

switching the second application program interface displayed in the second window between the full mode and the speed mode according to a selection of a user, and releasing resources occupied by the second application program interface in the full mode, when the second application program interface is switched from the full mode to the speed mode.

In addition, after the step of displaying a second window above the first window, the method further including:

switching the second window between a hidden state and a display state according to a selection of the user.

In addition, the first application program interface displayed in the first window is a game application program interface, and the second application program interface displayed in the second window is a voice application program interface.

The beneficial effect brought by the technical proposal provided in the embodiments of present disclosure is described in detail as follows.

In the technical proposal provided in the embodiment, the first window is displayed on the full screen, and the second window is displayed above the first window, displays different application program interfaces are respectively displayed in the two windows, and the first window always maintains in a focused state, so that the application program interface displayed in the first window can still maintain the performance without losing the focused state, and the application program interface displayed in the second window can be displayed above the first window in an unfocused state, thus causing convenience for operation. The way of displaying the application program interface does not generate a limitation to such as being intercepted, thus further improving versatility and reliability.

BRIEF DESCRIPTION OF THE DRAWINGS

In order to make embodiments of present disclosure more clearly, the drawings which are needed in the embodiments of present disclosure are described simply as follows. It is obviously, the drawings described as follows are only exemplary embodiments of present disclosure. To a person of ordinary skill in the art, under premise of no creative work, other drawings may be obtained according to the drawings.

DETAILED DESCRIPTION OF ILLUSTRATED EMBODIMENTS

Further descriptions of present disclosure will be illustrated clearly and completely, which is combined with embodiments in drawings and detailed embodiments.

A First Embodiment

Figure 1:
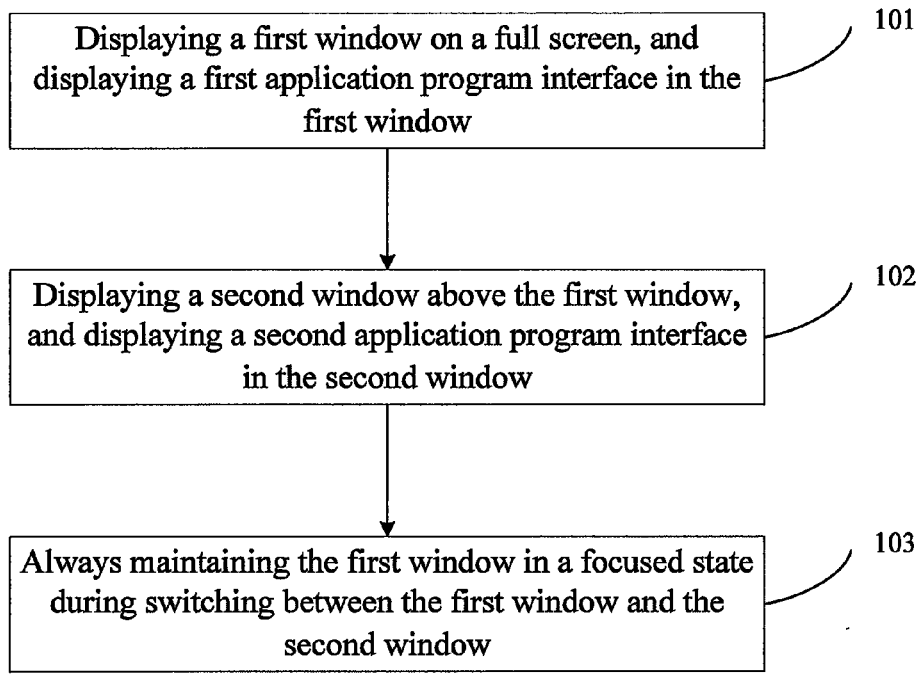
FIG. 1 is a flowchart of an application program interface display method according to a first embodiment of present disclosure.

An application program interface display method is provided in the present embodiment. Referring to FIG. 1, FIG. 1 is a flowchart of an application program interface display method according to a first embodiment of present disclosure. As shown in FIG. 1, the application program interface display method includes the following steps.

Step 101, displaying a first window on a full screen, and displaying a first application program interface in the first window.

Step 102, displaying a second window above the first window, and displaying a second application program interface in the second window.

In detail, the step of displaying a second application program interface in the second window, includes the following steps.

Displaying the second application program interface in a full mode in the second window, or displaying the second application program interface in a speed mode in the second window.

The second application program interface in the full mode displays all interface information of the second application program. The second application program interface in the speed mode displays simplified interface information of the second application program.

In addition, after the step of displaying the second application program interface in a full mode in the second window, or displaying the second application program interface in a speed mode in the second window, the step of displaying a second application program interface in the second window, further includes the following step.

Switching the second application program interface displayed in the second window between the full mode and the speed mode according to a selection of a user, and releasing resources occupied by the second application program interface in the full mode when the second application program interface is switched from the full mode to the speed mode.

Furthermore, after displaying a second window above the first window, the method further includes the following steps.

Switching the second window between a hidden state and a display state according to a selection of the user.

Step 103, always maintaining the first window in a focused state during switching between the first window and the second window.

The step of always maintaining the first window in a focused state during switching between the first window and the second window is described in detail as follows.

Setting a WS_EX_NOACTIVATE property for the second window, and always maintaining the first window in a focused state during switching between the first window and the second window according to the WS_EX_NOACTIVATE property.

Further, the first application program interface displayed in the first window is a game application program interface, and the second application program interface displayed in the second window is a voice application program interface.

It should be noted that the first window mentioned in the present embodiment and the following embodiments can be, but not limited to, a browser window in a browser, or a game application program window which is ran out of the browser, or other application program windows. The first window is not limited to any detailed window in the present embodiment, and the second window is also not limited to any detailed window in the present embodiment, for example, the second window can be but not limited to a voice application program window, etc.

In the method provided in the embodiment, the first window is displayed on the full screen, and the second window is displayed above the first window; different application program interfaces are respectively displayed in the two windows, and the first window always maintains in a focused state, so that the application program interface displayed in the first window can still maintain the performance without losing the focused state, and the application program interface displayed in the second window can be displayed above the first window in an unfocused state, thus causing convenience for operation. Moreover, the method provided in the embodiment does not depend on the Hook technology, and cannot be intercepted by the security application programs because the method provided in the embodiment is not mistaken by the security application programs as a Trojan behavior. An administration authority of an operating system is not needed to be considered when the Hook technology is used, and the way of displaying the application program interface does not generate a limitation to such as being intercepted, thus further improving versatility and reliability.

In order to explain the application program interface display method provided in the above-described embodiment more clearly, an illustration of the application program interface display method is provided by taking a second embodiment combined with the above embodiment as example.

A Second Embodiment

Figure 2:
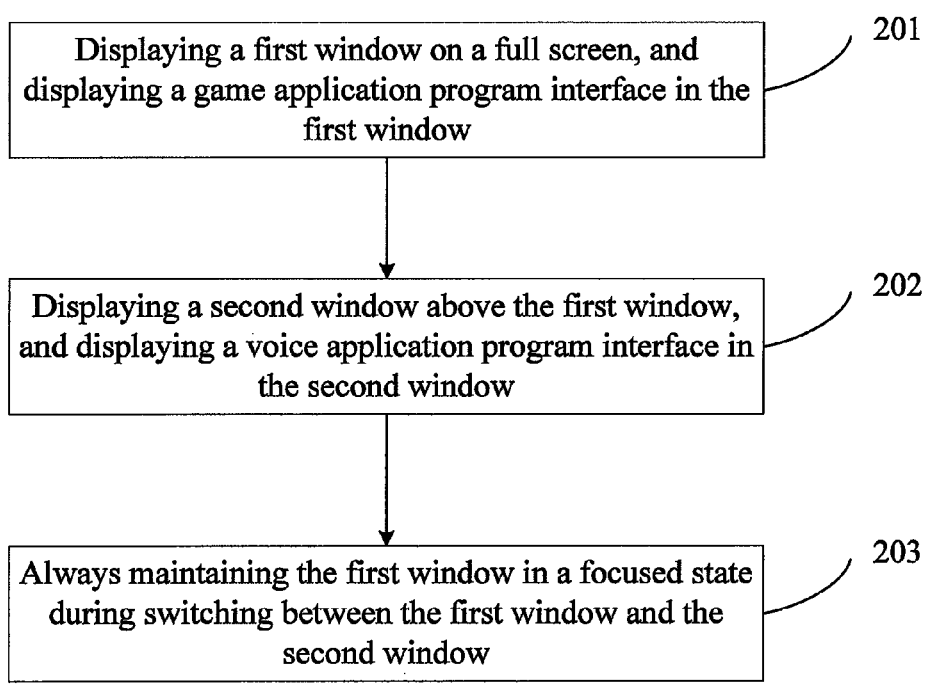
FIG. 2 is a flowchart of an application program interface display method according to a second embodiment of present disclosure.

An application program interface display method is provided in the present embodiment, in order to describe the method of the embodiment more conveniently, the method will be illustrated by combining the content of the first embodiment. The application program interface display method in the present embodiment will be illustrated in detail as follows. In the present embodiment, for example, the first application program interface displayed in the first window is a game application program interface and the second application program interface displayed in the second window is a voice application program interface. Referring to FIG. 2, the method provided in the embodiment includes the following steps.

Step 201, displaying a first window on a full screen, and displaying a game application program interface in the first window.

The way of displaying the first window on a full screen in the step is the same as that of the existing technology and the present embodiment will not do any specific limitation to the way of displaying the first window. When the first window displays the game application program interface, the game application program interface is drawn in the first window by rendering. Since the first window is displayed in the form of full screen, thus the game application program interface can be displayed in the first window in the form of full screen.

An operation of drawing the game application program interface in the first window by rendering will be illustrated in detail as follows.

Drawing the game application program interface in the first window, and rendering images and game characters generated in real-time by the game application program to the first window.

Step 202, displaying a second window above the first window, and displaying a voice application program interface in the second window. In detail, when the second window is displayed above the first window, displaying position of the second window will not be limited in the present embodiment. When the second window displays the voice application program interface, the voice application program interface can also be drawn in the second window by rendering. Since the first window is displayed in the way of the full screen, and the second window is displayed above the first window, so that the voice application program interface is visually displayed above the game application program interface which is displayed in the form of a full screen.

In order not to affect the user to use the game application program, preferably, the size of the second window is less than or equal to one fourth of the size of the first window.

The property of the second window is periodically set as a topmost window. When a terminal displays a window, a window of which property is recently set as the topmost window is displayed. Because the property of the second window is periodically set to be the topmost window, thus the terminal can maintain the second window to be displayed above the first window.

The voice application program interface is configured to display human-computer interaction interface elements corresponding to each function included in the voice application program. For example, referring to FIG. 3, the voice application program includes a text chart function. The human-computer interaction interface elements corresponding to the text chart function include an input window 23 and a "sending" button. The user can input text in the input window 23 and sends the text out by clicking the "sending" button.

An operation of drawing the voice game application program interface in the second window by rendering will be illustrated in detail as follows.

Drawing the voice application program interface in the second window, and rending a human-computer interaction interface element corresponding to each function included in the voice application program in the second window.

In addition, according to the scenario of the first window displaying the game application interface, when the second window displays the second application program interface, apart from displaying a complete voice application program interface, in order not to affect the user to operate the game application program interface when playing the game, a method is provided in the present embodiment. The method also supports to display a simplified interface of the voice application program. Displaying the second application program interface in the second window includes the following steps in detail.

Displaying the second application program interface in a full mode in the second window, or displaying the second application program interface in a speed mode in the second window.

The second application program interface in the full mode can display all the interface information of the second application program. The second application program interface in the speed mode can display simplified interface information of the second application program.

Figure 3:
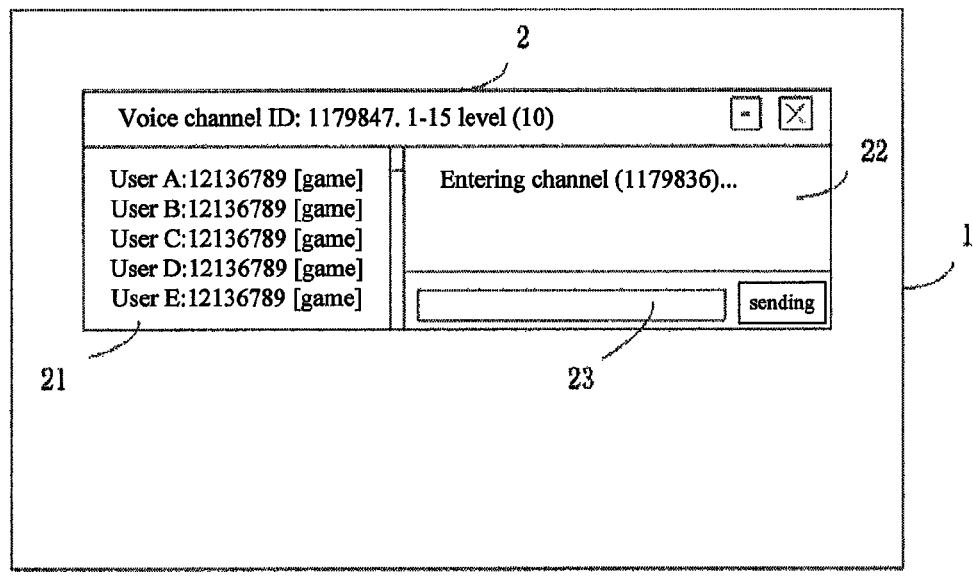
FIG. 3 is a schematic diagram of an application program display interface according to the second embodiment of present disclosure.
Figure 4:
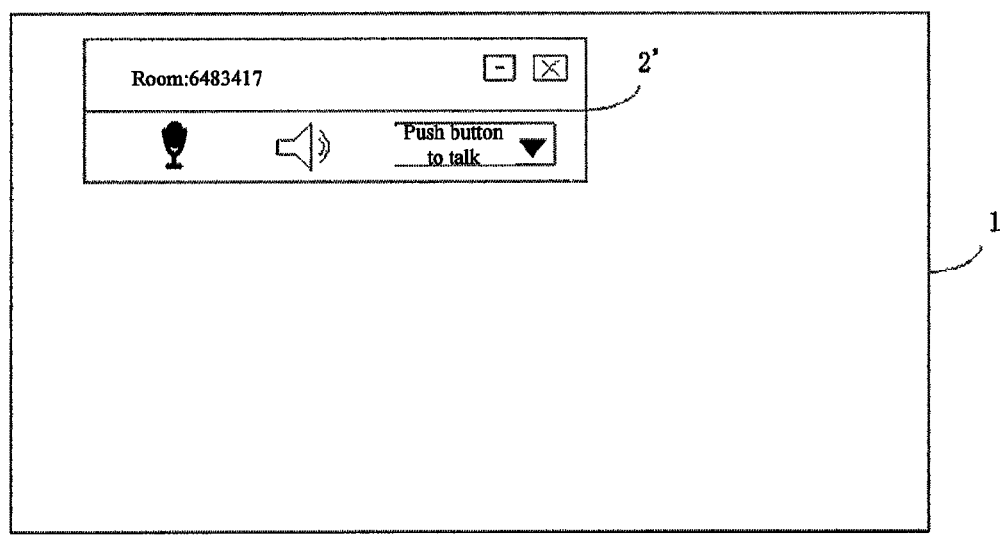
FIG. 4 is another schematic diagram of an application program display interface according to the second embodiment of present disclosure.

Types the voice application program interface in the full mode and in the speed mode are not specifically limited in the present embodiment. Taking the application program interface in the full mode as shown in FIG. 3 as an example, as shown in FIG. 3, 1 is the first window which is configured to display the game application program interface; 2 is the second window 2 which is configured to display the voice application program interface, and the voice application program interface displayed in the second window is in the full mode. The voice application program interface displays a voice channel identity (ID). The voice application program interface also includes a member list sub-interface 21, a voice conversation sub-interface 22, an information input sub-interface 23 and so on. It should be noted that the voice application program interface in the full mode may includes other information in a detailed embodiment, and it is not limited to any detail information in the embodiment. Taking the application program interface in the speed mode as shown in FIG. 4 as an example, as shown in FIG. 4, 1 is the first window which is configured to display the game application program interface; 2' is the second window which is configured to display the voice application program interface, and the voice application program interface displayed in the second window is in the speed mode. The voice application program interface in the speed mode is designed simply, and only functions related to voice cooperation are retained. As shown in FIG. 4, the voice application program interface in the speed mode displays room number information and a few icons can display main functions of the voice application program. It should be noted that the voice application program interface in the speed mode may also include other information in a detailed embodiment, and this embodiment does not make any specific limitation. It also should be noted that the voice application program interface may be displayed in the full mode, or the speed mode, or even other modes, the present embodiment does not make any specific limitation.

No matter the voice application program interface is displayed in the full mode or in the speed mode, the user can see the voice application program interface but without leaving the game application program interface even through the game application program interface is displayed under full screen. Further, the user can operate the voice application program interface by directly clicking the mouse to perform a voice operation. In addition, in order to meet a display requirement for the voice application program interface of the user, after the step of displaying the second application program interface in a full mode in the second window, or displaying the second application program interface in a speed mode in the second window, the method provided in the embodiment further includes the following step: switching the second application program interface displayed in the second window between the full mode and the speed mode according to a selection of the user. A trigger way of switching between the full mode and the speed mode can be implemented by setting a switching button. For example, by setting a switching button in the first window or the second window, the user can switch the second application program interface between the full module and the speed module by operating the switching button. In addition, a trigger way of switching between the full mode and the speed mode can be implemented by setting related options, for example, by setting display mode options for the second application program interface in the first window or the second window, the second application program interface can display different modes by means of selecting corresponding display mode options by the user. Understandably, other switching manner can also be selected, and it is not limited to any switching way in the present embodiment.

The terminal prestores a first size of the second window in the full mode and human-computer interface elements corresponding to functions included in the second application program displayed in the second window. In addition, the terminal prestores a second size of the second window in the speed mode and human-computer interface elements corresponding to functions included in the second application program displayed in the second window.

The second size is smaller than the first size. The number of the human-computer interface elements corresponding to the functions included in the second application program displayed in the second window in the speed mode is fewer than the number of the human computer interface elements corresponding to the functions included in the second application program displayed in the second window in the full mode.

In the speed mode, the human-computer interface elements corresponding to the functions included in the second application program displayed in the second window are preset according to user demands under a current scenario of the first application program and the second application program. For example, in the embodiment of present disclosure, the first application program is a game application program, and the second application program is a voice application program. A current scenario of the game application program and the voice application program is an application scenario of voice chart while playing game of the user. Under the current scenario, the user demand is a requirement of a user for a voice function of the voice application program, apart from requirements for a text chat function and an entertainment function included in the voice application program. Thus, in the speed mode, the human-computer interaction interface elements corresponding to the functions included in the second application program displayed in the second window can be set as human-computer interaction interface elements corresponding to the voice function.

The step of switching the second application program interface displayed in the second window between the full mode and the speed mode according to a selection of the user, can be described in detail as follows.

When the user selects to switch the second application program interface displayed in the second window from the full mode to the speed mode, obtaining the second size of the second window and the human-computer interface elements corresponding to the functions included in the second application program in the second window, establishing the second window according to the second size, and rendering the computer-human interface elements corresponding to the functions included in the second application program in the second window to the second window.

When the user selects to switch the second application program interface displayed in the second window from the speed mode to the full mode, obtaining the first size of the second window and the human-computer interface elements corresponding to the functions included in the second application program in the second window, establishing the second window according to the first size, and rendering the computer-human interface elements corresponding to the functions included in the second application program in the second window to the second window.

Further, because the information displayed in the second application program interface in the speed mode is less than the information displayed in the second application program interface in the full mode, therefore, when switching the second application program interface from the full mode to the speed mode by the user, the method provided in the embodiment further includes a step of releasing resource occupied by the second application interface in the full mode, which can save more resources of the full mode than the resources of the speed mode.

In the step of releasing resource occupied by the second application interface in the full mode, the resource includes, but not limited to, a resource of a local user interface (UI) layer, a resource of a network layer, and a resource of a voice transmission layer. In detail, the resource will be described as follows.

(1) releasing the resource of the local UI layer: the resource of the local UI layer includes but not limited to a voice room list of the voice application program interface, marketing information displayed in a browser interface, etc. Memory usage can be greatly reduced by releasing the resource of the local UI layer.

(2) releasing the resource of the network layer: because a voice server may have a great influence on the bandwidth when broadcasting messages, therefore, the voice application program interface in the speed mode can avoid the resource which occupies a lot of bandwidth in a functional design; when the speed mode is activated, the server stops issuing the member list of the voice room, refreshing on/off status of members, and stops issuing text chart message, etc., which can greatly save the bandwidth.

Wherein, the terminal can send function identifiers which do not need to be displayed in the second window in the speed mode to the server. The server receives the function identifiers sent from the server, and stops continuing to perform functions corresponding to the function identifiers.

(3) releasing resource of the voice transmission layer: for the voice transmission layer, on the one hand, in order to keep balance between a tone quality and a bandwidth according to a voice demand in a game scenario in the speed mode, so that a part of tone quality loses to occupy a smaller bandwidth; on the other hand, implementation model of shielding voice is changed, such as, the implementation model of shielding voice is changed from a local shielding to a shielding by the server, namely, a distributed switch is added to the server, when the voices of all the members in the room are shielded or the voice of a single member in the room is shielded, voice server actively stops issuing the voice data, which can achieve an effect of saving the resource.

In the case of shielding the voices of all the members in the room, the terminal sends a shielding request message to the voice server, the voice server receives the shielding request message, and stops issuing the voice data. In the case of shielding the voice of a single member, the terminal sends a shielding request message to the voice server; the shielding request message carries an identification of the member. The voice server receives the shielding request message and stops issuing the voice data generated by the member according to the shielding request message.

By releasing the above mentioned resources, the voice application program can be run but without occupying too many resources. In addition, by making a balance between the tone quality and the bandwidth, when the game application program interface and the voice application program are switched therebetween, the voice communication cannot be affected.

Further, no matter the second application program interface is displayed in the full mode or the second application program interface is displayed in the speed mode, after the step of displaying the second window above the first window, the method provided in the embodiment further includes: switching the second window between a hidden state and a display state according to a selection of the user. A trigger manner of switching the second window between the hidden state and the display state can be realized by setting a shortcut key. For example, by operating a shortcut key F9, the second window can be hidden and displayed corresponding to the hidden state and the display state. Taking the second window being in the display state as an example, if the user clicks the shortcut key F9, the second window is hidden; If the user clicks the shortcut key F9 again, the second window is displayed. Understandably, except for the shortcut key F9, other shortcut keys can be selected to realized the switching function of switching the second window between the hidden state and the display state. It should be noted that other trigger manners can also be selected except for realizing the switching function in a manner of shortcut key, and it is not limited to any manner in the embodiment.

Step 203, always maintaining the first window in a focused state during switching between the first window and the second window. In this step, the reason of always maintaining the first window in a focused state during switching between the first window and the second window is to make the game application program interface to be in a non-focused state, resulting in realizing a voice operation experience still in a game environment. The step of always maintaining the first window in a focused state during switching between the first window and the second window is described in detail as follows in the present embodiment.

Setting a WS_EX_NOACTIVATE property for the second window, and always maintaining the first window in a focused state during switching between the first window and the second window according to the WS_EX_NOACTIVATE property.

When the Windows operating system processes a window which has the WS_EX_NOACTIVATE property, most Windows messages, such as the mouse, are normally sent to the window to be processed, but the window is not always set to be in the focused state. Since the second window has the WS_EX_NOACTIVATE property, not only the voice application program interface displayed by the second window is displayed above the window in which the voice application program interface is displayed, but also the second window always does not obtain the focus when the functions on the voice application program interface are operated, to make the second window in the focused state not to lose the focus. Thus, the game application program interface is always displayed in full screen, and will not bring any influence to the game operation of the user, which will further bring a convenient experience generated by directly operating the voice function without switching the game window under the game environment of full screen.

In the embodiment, since the first window is always maintained in the focused state, when the second window is operated by the user by using a mouse, the terminal can also render images and game characters generated by the game application program in real time to the first window, avoiding a stuck phenomenon of the game application.

In the method provided in the embodiment, the first window is displayed on the full screen, and the second window is displayed above the first window; different application program interfaces are respectively displayed in the two windows, and the first window always maintains in a focused state, so that the application program interface displayed in the first window can still maintain the performance without losing the focused state, and the application program interface displayed in the second window can be displayed above the first window in an unfocused state, thus causing convenience for operation. Moreover, the method provided in the embodiment does not depended on the Hook technology, and can not be intercepted by the security application programs because the method provided in the embodiment is not mistaken by the security application programs as a Trojan behavior. An administration authority of an operating system is not needed to be considered when the Hook technology is used, and the way of displaying the application program interface does not generate a limitation to such as interception, thus further improving versatility and reliability.

A Third Embodiment

Figure 5:
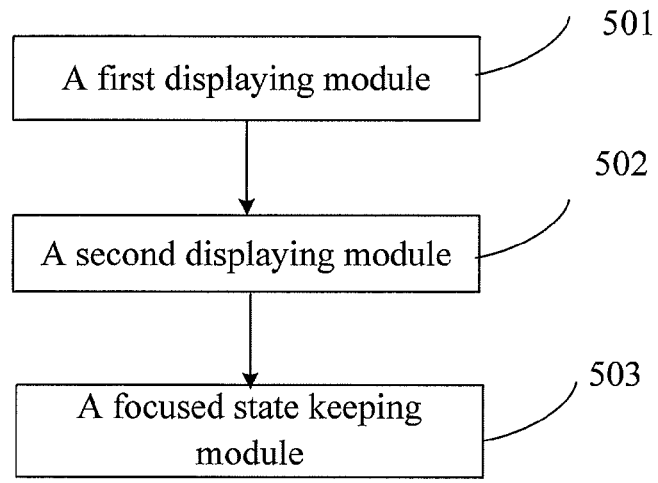
FIG. 5 is a schematic diagram of an application program display device according to a third embodiment of present disclosure.

An application program interface display device is provided in the embodiment. The application program interface is configured to implement the application program interface display method provided in the first embodiment and the application program interface display method provided in the second embodiment. Referring to FIG. 5, the device includes the following modules.

A first displaying module 501 is configured to display a first window on a full screen, and display a first application program interface in the first window.

A second displaying module 502 is configured to display a second window above the first window, and display a second application program interface in the second window.

A focused state keeping module 503 is configured to always maintain the first window displayed by the first displaying module 501 in a focused state during switching between the first window displayed by the first displaying module 501 and the second window displayed by the second displaying module 502.

The first displaying module 501 displays the first window. A detail manner of displaying the first application program interface by the first window can refer to the description of the step 201 in the second embodiment, and it is not repeated here. The second displaying module 502 displays the second window above the first window. A detail manner of displaying the second application program interface by the second window can refer to the description of the step 202 in the second embodiment, and it is not repeated here. A detail manner of always maintaining the first window in the focused state by the focused state keeping module 503 can refer to the description of the step 203 in the second embodiment, and it is not repeated here.

Combining with the description of the step 203 in the second embodiment, the focused state keeping module 503 is specifically configured to set a WS_EX_NOACTIVATE property for the second window, and always maintain the first window in a focused state during switching between the first window and the second window according to the WS_EX_NOACTIVATE property.

Furthermore, combining with the description of the step 202 in the second embodiment, the second displaying module 502 is specifically configured to display the second application program interface in a full mode in the second window, or display the second application program interface in a speed mode in the second window.

The second application program interface in the full mode displays all interface information of the second application program. The second application program interface in the speed mode displays simplified interface information of the second application program.

Figure 6:
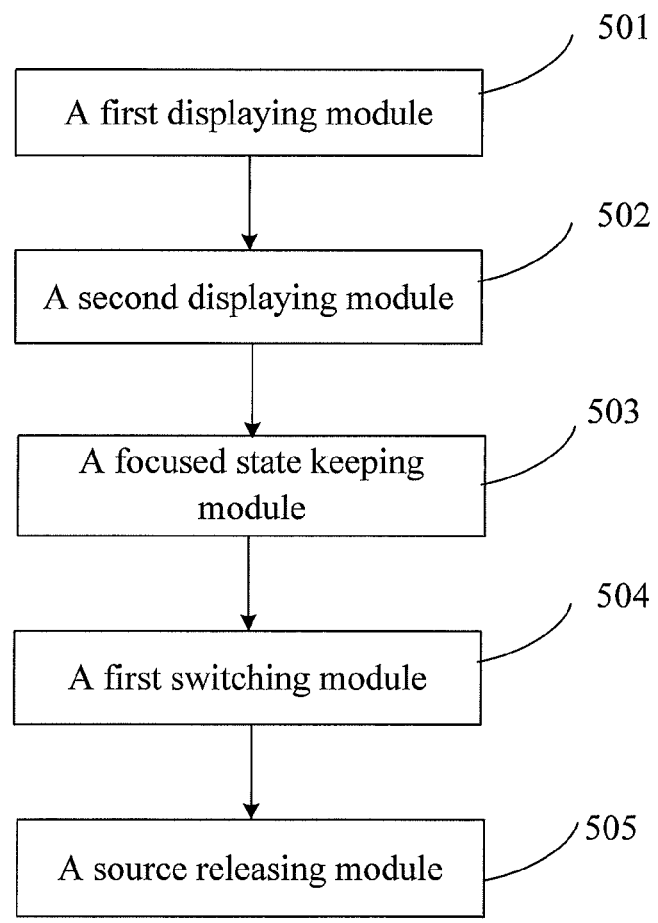
FIG. 6 is another schematic diagram of an application program display device according to a third embodiment of present disclosure.

Combining with the description of the step 202 in the second embodiment, a flexibility of displaying the application program interface is improved and at the same time a source is saved. Referring to FIG. 6, the device also includes the following modules.

A first switching module 504 is configured to switch the second application program interface displayed in the second window between the full mode and the speed mode according to a selection of a user.

A source releasing module 505 is configured to releasing sources occupied by the second application program interface in the full mode when the second application program interface is switched by the first switching module 504 from the full mode to the speed mode.

A detail manner of switching the second application program interface between the full mode and the speed mode by the first switching module 504, and a detail manner of releasing sources occupied by the second application program interface in the full mode by the source releasing module 505 can refer to the step 202 in the second embodiment, and they are not repeated here.

Figure 7:
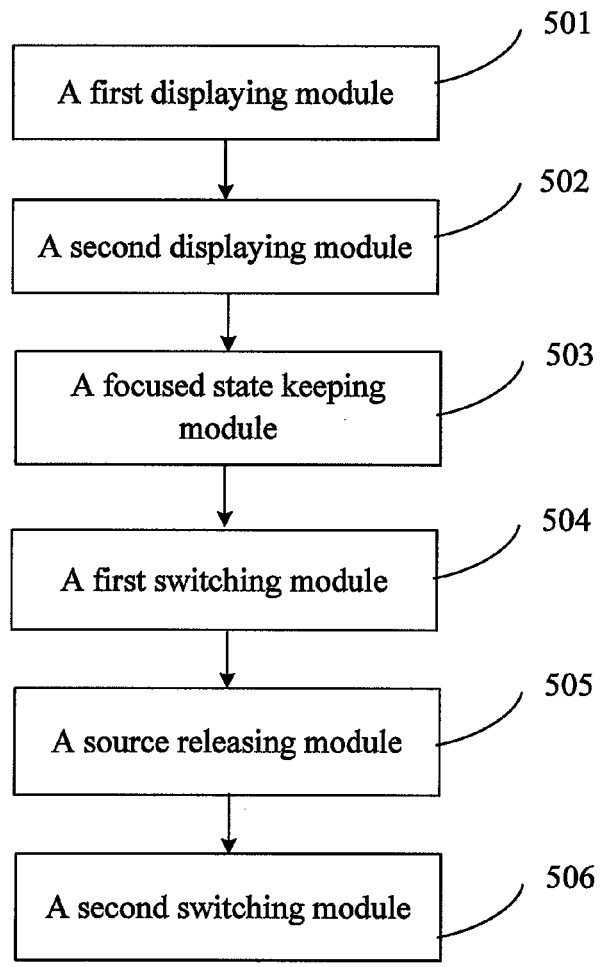
FIG. 7 is yet another schematic diagram of an application program display device according to a third embodiment of present disclosure.

Furthermore, in order to meet a user's requirement of displaying the application program interface, the device also includes a second switching module 506 as shown in FIG. 7. The second switching module 506 is configured to switch the second window displayed by the second displaying module 502 between a hidden state and a display state according to a selection of the user. A manner of switching the second window between the hidden state and the display state by the second switching module 506 can refer to the step 202 in the second embodiment, and it is not repeated here.

In actual application, the first application program interface displayed in the first window which is displayed by the first displaying module 501 can be a game application program interface, and the second application program interface displayed in the second window which is displayed by the second displaying module 502 can be a voice application program interface. Of course, the first window and the second window can display other application program interface. The first application program interface displayed in the first window is not limited to a particularly first application program interface in the embodiment. At the same time, the second application program interface displayed in the second window is not limited to a particularly second application program interface in the embodiment.

In the device provided in the embodiment, the first window is displayed on the full screen, and the second window is displayed above the first window; different application program interfaces are respectively displayed in the two windows, and the first window always maintains in a focused state, so that the application program interface displayed in the first window can still maintain the performance without losing the focused state, and the application program interface displayed in the second window can be displayed above the first window in an unfocused state, thus causing convenience for operation. Moreover, the method provided in the embodiment does not depended on the Hook technology, and can not be intercepted by the security application programs because the method provided in the embodiment is not mistaken by the security application programs as a Trojan behavior. An administration authority of an operating system is not needed to be considered when the Hook technology is used, and the way of displaying the application program interface does not generate a limitation to such as interception, thus versatility and reliability are improved.

A Fourth Embodiment

Figure 8:
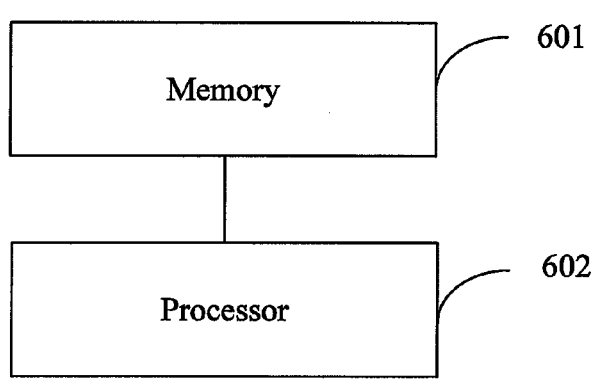
FIG. 8 is a schematic diagram of a terminal according to a fourth embodiment of present disclosure.

Referring to FIG. 8, a terminal is provided in the embodiment of present disclosure. The terminal includes the following components.

A memory 601.

One or more than one programs are stored in the memory, and are implemented by one or more than one processor 602. The one or more than one programs are configured to implement the following steps.

Displaying a first window on a full screen, and displaying a first application program interface in the first window.

Displaying a second window above the first window, and displaying a second application program interface in the second window.

Always maintaining the first window in a focused state during switching between the first window and the second window.

The step of always maintaining the first window in a focused state during switching between the first window and the second window is described in detail as follows.

Setting a WS_EX_NOACTIVATE property for the second window, and always maintaining the first window in a focused state during switching between the first window and the second window according to the WS_EX_NOACTIVATE property.

In detail, the step of displaying the second application program interface in the second window includes the following steps.

Displaying the second application program interface in a full mode in the second window, or displaying the second application program interface in a speed mode in the second window.

The second application program interface in the full mode displays all interface information of the second application program. The second application program interface in the speed mode displays simplified interface information of the second application program.

After the step of displaying the second application program interface in a full mode in the second window, or displaying the second application program interface in a speed mode in the second window, the method further includes the following step.

Switching the second application program interface displayed in the second window between the full mode and the speed mode according to a selection of a user, and releasing resource occupied by the second application program interface in the full mode when the second application program interface is switched from the full mode to the speed mode.

After displaying the second window above the first window, the method further includes the following steps.

Switching the second window between a hidden state and a display state according to a selection of the user.

The first application program interface displayed in the first window is a game application program interface, and the second application program interface displayed in the second window is a voice application program interface.

In the embodiment, the first window is displayed on the full screen, and the second window is displayed above the first window; different application program interfaces are respectively displayed in the two windows, and the first window always maintains in a focused state, so that the application program interface displayed in the first window can still maintain the performance without losing the focused state, and the application program interface displayed in the second window can be displayed above the first window in an unfocused state, thus causing convenience for operation. Moreover, the method provided in the embodiment does not depended on the Hook technology, and can not be intercepted by the security application programs because the method provided in the embodiment is not mistaken by the security application programs as a Trojan behavior. An administration authority of an operating system is not needed to be considered when the Hook technology is used, and the way of displaying the application program interface does not generate a limitation to such as interception, thus versatility and reliability are improved.

A Fifth Embodiment

A computer readable storage medium is provided in the embodiment of present disclosure. The computer storage medium stores one or more than one programs. The one or more than one programs are implemented by one or more than one processor to display the application program interface method. The method includes the following steps.

Displaying a first window on a full screen, and displaying a first application program interface in the first window.

Displaying a second window above the first window, and displaying a second application program interface in the second window.

Always maintaining the first window in a focused state during switching between the first window and the second window.

The step of always maintaining the first window in a focused state during switching between the first window and the second window is described in detail as follows.

Setting a WS_EX_NOACTIVATE property for the second window, and always maintaining the first window in a focused state during switching between the first window and the second window according to the WS_EX_NOACTIVATE property.

In detail, the step of displaying the second application program interface in the second window includes the following steps.

Displaying the second application program interface in a full mode by the second window, or displaying the second application program interface in a speed mode by the second window.

The second application program interface in the full mode displays all interface information of the second application program. The second application program interface in the speed mode displays simplified interface information.

After the step of displaying the second application program interface in a full mode in the second window, or display the second application program interface in a speed mode in the second window, the method further includes the following step.

Switching the second application program interface displayed in the second window between the full mode and the speed mode according to a selection of the user. When the second application program interface is switched from the full mode to the speed mode, releasing resource of the second application program interface occupied in the full mode.

After displaying the second window above the first window, the method further includes the following steps.

Switching the second window between a hidden state and a display state according to a selection of the user.

The first application program interface displayed in the first window is a game application program interface, and the second application program interface displayed in the second window is a voice application program interface.

In the method provided in the embodiment, the first window is displayed on the full screen, and the second window is displayed above the first window; different application program interfaces are respectively displayed in the two windows, and the first window always maintains in a focused state, so that the application program interface displayed in the first window can still maintain the performance without losing the focused state, and the application program interface displayed in the second window can be displayed above the first window in an unfocused state, thus causing convenience for operation. Moreover, the method provided in the embodiment does not depended on the Hook technology, and can not be intercepted by the security application programs because the method provided in the embodiment is not mistaken by the security application programs as a Trojan behavior. An administration authority of an operating system is not needed to be considered when the Hook technology is used, and the way of displaying the application program interface does not generate a limitation to such as interception, thus a versatility and a reliability are improved.

It should be noted that the application program interface display device provided in the embodiment is only taken for example by dividing functional modules. In actual application, the function can be realized by different functional modules according to a requirement. In another words, the internal structure of the device can be divided into different functional modules to complete all of or part of the function. In addition, the application program interface display device and the application program interface display method belong to the same conception, a realization of the application program interface display device can refer to the method in the above embodiment, and it is not repeated here.

It is noted that each serial number of each embodiment in the embodiment is only used to describe the present disclosure, and is not represent the advantage or disadvantage of each embodiment.

It is understood to the person in the art that all of the steps or part of the steps in the above embodiment can be realized by hardware or can be realized by a program instructing related hardware. The program can be stored in a computer readable storage medium. The above-mentioned computer readable storage medium can be a read only memory, a disk or a compact disk, etc.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. An application program interface display method comprising:
    displaying a first window on a full screen, and displaying a first application program interface of a first application program in the first window;
    displaying a second window above the first window while the first window is displayed on the full screen, and displaying a second application program interface of a second application program in the second window while the first application program interface is displayed in the first window on the full screen, and switching the second window between a hidden state and a display state according to a selection of the user, wherein the second application program is different from the first application program; and
    maintaining the first window in a focused state during switching between the first window and the second window, further including:
    setting a WS_EX_NOACTIVATE property for the second window, and
    maintaining the first window in a focused state during the switching between the first window and the second window according to the WS_EX_NOACTIVATE property.

2. The application program interface display method according to claim 1, wherein displaying the second application program interface of the second application program in the second window comprises:
    displaying the second application program interface in a full mode in the second window, or displaying the second application program interface in a speed mode in the second window,
    wherein the second application program interface in the full mode displays all interface information of the second application program, and the second application program interface in the speed mode displays simplified interface information of the second application program.

3. The application program interface display method according to claim 2, including, after displaying the second application program interface in the full mode, or displaying the second application program interface in the speed mode:
    switching the second application program interface displayed in the second window between the full mode and the speed mode according to a selection of a user, and releasing resources occupied by the second application program interface in the full mode, when the second application program interface is switched from the full mode to the speed mode.

4. The application program interface display method according to claim 1, wherein the first application program interface displayed in the first window is a game application program interface, and the second application program interface displayed in the second window is a voice application program interface.

5. A terminal, comprising:
    one or more processors;
    a memory; and
    one or more programs stored in the memory, and configured for execution by the one or more processors, the one or more programs comprising instructions for:
    displaying a first window on a full screen, and displaying a first application program interface of a first application program in the first window;
    displaying a second window above the first window while the first window is displayed on the full screen, and displaying a second application program interface in the second window while the first application program interface is displayed in the first window on the full screen, switching the second window between a hidden state and a display state according to a selection of the user, wherein the second application program is different from the first application program; and maintaining the first window in a focused state during switching between the first window and the second window, further including:

setting a WS_EX_NOACTIVATE property for the second window, and maintaining the first window in a focused state during the switching between the first window and the second window according to the WS_EX_NOACTIVATE property.

6. The terminal according to claim 5, wherein displaying the second application program interface of the second application program in the second window comprises:

displaying the second application program interface in a full mode in the second window, or displaying the second application program interface in a speed mode in the second window, wherein the second application program interface in the full mode displays all interface information of the second application program, and the second application program interface in the speed mode displays simplified interface information of the second application program.

7. The terminal according to claim 6, wherein the one or more programs further comprise instructions for, after displaying the second application program interface in the full mode, or displaying the second application program interface in the speed mode:

switching the second application program interface displayed in the second window between the full mode and the speed mode according to a selection of a user, and releasing resources occupied by the second application program interface in the full mode, when the second application program interface is switched from the full mode to the speed mode.

8. The terminal according to claim 5, wherein the first application program interface displayed in the first window is a game application program interface, and the second application program interface displayed in the second window is a voice application program interface.

9. A non-transitory computer readable storage medium storing one or more programs, the one or more programs comprising instructions which, when executed by a device having one or more processors, cause the device to perform operations including:

displaying a first window on a full screen, and displaying a first application program interface of a first application program in the first window;

displaying a second window above the first window while the first window is displayed on the full screen, and displaying a second application program interface of a second application program in the second window while the first application program interface is displayed in the first window on the full screen, and switching the second window between a hidden state and a display state according to a selection of the user, wherein the second application program is different from the first application program; and maintaining the first window in a focused state during switching between the first window and the second window, further including:

setting a WS_EX_NOACTIVATE property for the second window, and maintaining the first window in a focused state during the switching between the first window and the second window according to the WS_EX_NOACTIVATE property.

10. The computer readable storage medium according to claim 9, wherein displaying the second application program interface of the second application program in the second window includes:

displaying the second application program interface in a full mode in the second window, or displaying the second application program interface in a speed mode in the second window, wherein the second application program interface in the full mode displays all interface information of the second application program, and the second application program interface in the speed mode displays simplified interface information of the second application program.

11. The computer readable storage medium according to claim 10, wherein the one or more programs further include instructions for:

switching the second application program interface displayed in the second window between the full mode and the speed mode according to a selection of a user; and releasing sources occupied by the second application program interface in the full mode, when the second application program interface is switched by the first switching module from the full mode to the speed mode.

12. The computer readable storage medium according to claim 9, wherein the first application program interface displayed in the first window is a game application program interface and the second application program interface displayed in the second window is a voice application program interface.

* * * * *